US011132009B2

United States Patent

(12) United States Patent
Nazir et al.

(10) Patent No.: US 11,132,009 B2
(45) Date of Patent: Sep. 28, 2021

(54) ELECTRIC POWER CONVERTER

(71) Applicant: Infineon Technologies Austria AG, Villach (AT)

(72) Inventors: Salman Nazir, Munich (DE); Benjamin L. Schwabe, Munich (DE)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 16/901,246

(22) Filed: Jun. 15, 2020

(65) Prior Publication Data

US 2020/0401168 A1 Dec. 24, 2020

(30) Foreign Application Priority Data

Jun. 19, 2019 (EP) .................................... 19181251

(51) Int. Cl.

| | |
|---|---|
| ***G05F 1/46*** | (2006.01) |
| *G06F 1/26* | (2006.01) |
| *H02M 3/156* | (2006.01) |
| *H02M 1/36* | (2007.01) |
| *H02M 1/00* | (2006.01) |

(52) U.S. Cl.

CPC ................. *G05F 1/46* (2013.01); *G06F 1/26* (2013.01); *H02M 1/0003* (2021.05); *H02M 1/36* (2013.01); *H02M 3/1566* (2021.05)

(58) Field of Classification Search

CPC ... G05F 1/46; G06F 1/26; G06F 1/305; G06F 1/28; G05B 13/0265; H02M 3/1566; H02M 1/36; H02M 3/156; H02M 1/0003; H02M 3/00

See application file for complete search history.

(56) References Cited

U.S. PATENT DOCUMENTS 9,035,633 B1 * 5/2015 Slavin ........................ G05F 1/00 323/282
9,450,492 B1 * 9/2016 Bizjak ................... H02M 3/158
10,394,294 B2 * 8/2019 Pfeifer ............... H05K 7/20209

(Continued)

OTHER PUBLICATIONS

Ahmeid Mohamed et al: "Computationally Efficient Self-Tuning Controller for DC-DC Switch Mode Power Converters Based on Partial Update Kalman Filter", IEEE Transactions on Power Electronics, Institute of Electrical and Electronics Engineers, USA, vol. 33, No. 9, Sep. 1, 2018 (Sep. 1, 2018), pp. 8081-8090, XP011686197.

(Continued)

*Primary Examiner* — Kyle J Moody
*Assistant Examiner* — Lakaisha Jackson
(74) *Attorney, Agent, or Firm* — Armis IP Law, LLC

(57) ABSTRACT

An electric switch-mode power converter comprises: a parameter predictor for predicting and updating at least one regulator parameter of a regulator controlling a switching device of the converter, a performance feedback signal generator for providing a performance feedback signal indicative of a performance of the conversion operation, wherein the parameter predictor is configured to predict an update of the regulator parameter based on the performance feedback signal and during update intervals, the intervals being during the power conversion operation and being separated by pauses without update.

20 Claims, 3 Drawing Sheets

(56) References Cited

U.S. PATENT DOCUMENTS

2014/0084892 A1 3/2014 Trautmann et al.
2019/0187631 A1* 6/2019 Badgwell .............. G05B 11/011

OTHER PUBLICATIONS

Pradeep D John et al: "Nonlinear control of a boost converter using a robust regression based reinforcement learning algorithm", Engineering Applications of Artificial Intelligence, Pineridge Press, Swansea, GB, vol. 52, Feb. 24, 2016 (Feb. 24, 2016), pp. 1-9, XP029530608.
Shi Qian et al: "Adaptive PIO controller based on-learning algorithm",CAAI Transactions on Intelligence Technology, The Institution of Engineering and Technology, Michael Faraday House, Six Hills Way, Stevenage, Herts. SGI 2AY, UK, vol. 3, No. 4, Dec. 1, 2018 (Dec. 1, 2018), pp. 235-244, XP006071171.
EP Search Report, EP 19 18 1251, dated Dec. 12, 2019, pp. 46.

* cited by examiner

ELECTRIC POWER CONVERTER

RELATED APPLICATION

This application is related to and claims priority to earlier filed European Patent Application Serial Number EP19181251 entitled "ELECTRIC POWER CONVERTER," filed on Jun. 19, 2019, the entire teachings of which are incorporated herein by this reference.

TECHNICAL FIELD

This disclosure relates to an electric power converter having a switching device for a conversion operation and a regulator for controlling the switching device.

BACKGROUND

Electric power converters, in particular switch-mode power converters, are in wide practical use in various technical fields. This applies, in particular, to DC-DC power converters such as for power supply of CPUs or GPUs of computers or similar devices. In this context and also elsewhere, also so-called multi-phase power converters are known which convert electric currents or voltages within a plurality of phases and thus are made of a plurality of converter branches in parallel.

In general, a switch-mode power converter comprises at least one switching device to be switched for the power conversion of the converter. This switching operation is controlled by a regulator which usually can be tuned before use by adjusting at least one regulator parameter. Such adjustments can be critical for the operation performance of the power converter and they can be sensitive with regard to even minor changes in the design or in the selection of electric component values. In the well-known type of the PID regulator, the regulator parameters comprise the respective coefficients of the proportional (P) part, the integral (I) part, and the derivative (D) part thereof.

SUMMARY

The present disclosure is, however, not limited to PID regulators and also relates to other types of power converters, whether comprising simple P, I or D power converters or any combinations of these parts, or not. Likewise, the disclosure relates to single-phase power converters as well as to multi-phase power converters.

Embodiments herein provide an electric power converter being improved with regard to a regulator parameter adjustment.

Hereto, the disclosure, in one aspect, relates to a switch-mode electric power converter along claim 1 whereas further advantageous embodiments can be taken from the dependent claims.

According to claim 1, an electric power converter serves for converting input quantities wherein this term represents an input voltage and an input current. Likewise, the converted output quantities are a converted output voltage and a converted output current. Respective input and output terminals are provided for receiving and outputting these quantities, respectively. Further, the conversion operation of the power converter includes a switching operation of a switching device, the switching device being controlled by a regulator via a control terminal of the switching device. This control is based on at least one regulator parameter such as the P (Proportional), I (Integral), D (Derivative) coefficients or a less-than-all selection therefrom or other parameters.

In order to adjust the at least one regulator parameter, a parameter predictor is provided in this aspect for updating the regulator parameter. Further, a performance feedback signal generator operable for providing a performance feedback signal is connected to the power converter's output terminal. Thus, the performance feedback signal generator can produce the performance feedback signal to indicate a performance of the conversion operation of the power converter. The performance feedback signal is the basis for the updating of the regulator parameter by the parameter predictor, it is the feedback informing the parameter predictor of the effect of the most recent parameter update and of the actual performance with the actual (at least one) regulator parameter.

This must not be confused with the (ordinary) regulation feedback of the regulation feedback loop. In one embodiment, the performance feedback signal is fed to the parameter predictor which is not part of the (ordinary) regulation feedback loop.

In the above aspect, the updating is performed during certain update intervals (in time). These update intervals are arranged during the power conversion operation of the power converter. In other words, the power conversion operation of the power converter is, in this embodiment, not interrupted for the purpose of a regulator parameter updating but the updating is performed during the operation of the power converter, which can be qualified of "regular" or "normal". This power conversion operation, however, does not imply a steady state. Instead, a typical situation would be a load step such as transient increase or decrease in current consumption by the load, the regulation system being out of balance and in the need to recover. The above mentioned performance feedback signal would then indicate the performance of the regulation system in this recovery.

As indicated by the term "interval", the update intervals are mutually separated by time pause intervals without parameter updating, in other words by pauses between the update intervals.

Thereby, the electric power converter according to this aspect is adapted to staying updated as regards the at least one regulator parameter and thus obviates substantial performance losses due to a principally possible outdating of regulator parameters. As an example, electronic components might be subject to ageing wherein the ageing process has an impact on the electric behavior of the component of relevance for the regulator operation and thus for the power converter's performance Although being a generally rather slow phenomenon such aging can have a detrimental effect in certain cases. On the other hand, according to one embodiment, an interruption of the power converter operation for the purpose of adjusting the regulator parameters is unnecessary and the power converter can principally operate continuously if of interest.

However, due to the updating only in certain update intervals and not in the pauses therebetween, this embodiment can be more efficient as regards energy consumption because the updating operation as such will in general cause a certain energy consumption. Therefore, in view of energy efficiency, an updating of the regulator parameter only in dedicated update intervals separated by pause intervals (a.k.a., pauses) can be advantageous. This applies in particular to cases where the regulator parameter becomes outdated or suboptimal only due to slow processes such as ageing of components which is, however, an important cause of suboptimal power converter performance, as found by the inventors. Thus, the above described aspect of this invention is a favorable compromise between performance optimization of the power converter and efficiency.

According to a preferred implementation of this aspect, a deviation detector is provided. The deviation detector is operative to determine a deviation between a current signal of at least one of the output quantities and a desired output signal of this respective output quantity, and it is connected to the output of the power converter for this purpose. In a certain mode of operation of the power converter, the deviation determined can be compared to a predetermined threshold for checking if the deviation exceeds the threshold. If so, the deviation detector can, in this mode of operation, produce a signal for triggering an update interval as explained above. In other words, the deviation detector could be operable for initiating the updating by triggering the update interval if and only if a certain deviation threshold has been exceeded.

As an alternative, the pauses between the update intervals could also be predetermined, in particular regular. For example, the pauses could be of equal length so that an update interval would be started after a pause interval of for example an hour, a day, a week, or a month after the last update interval. Also, an update interval could be triggered after each restart (or each second, third . . . restart). Then, the above-mentioned predetermination would relate to the restart. In any case, a deviation detector would not be needed in these implementations.

However, a combination of both concepts would also be possible, namely in that the deviation detector starts its deviation detection operation only after the elapse of a certain minimum pause which is predetermined as above. Then, the update interval would be started not before the end of this pause but not necessarily at its end. Instead, it would only be started at the pause's end if the deviation detected is sufficiently large as also explained above. Alternatively, the update interval would only be started after a restart if the deviation detected is sufficiently large. In other words: The deviation detector is not necessarily continuously active (as regards its operation of the deviation detection) but it can be in certain embodiments.

The desired output signal for the above-mentioned comparison can be stored locally within the electric power converter although this is not mandatory. It might also be looked-up at a remote location or it might be computed individually according to a certain predetermined algorithm.

In particular, the desired output signal may be an "optimal" output signal predetermined preferably as follows. Namely, this optimal output signal may be defined for a certain load scenario and this load scenario is selected from among a plurality of predefined load scenarios. These load scenarios can be predefined to reflect typical and/or typically critical load conditions of the power converter under consideration. Further, a very good or even ideal performance of the power converter under such load conditions can be defined as a respective optimal output signal for each such load scenario. Again, the load scenarios and/or the respective optimum output signals are not necessarily available locally but could be stored remotely.

The comparison between the load conditions and the predefined load scenarios can be done using some metric to define a criterion for similarity. In particular, the comparison could use a classical binary regression/classification approach. Also, a trained neural network could be used to compare the current load conditions of the power converter with the predefined load scenarios.

Further, the load of the electric power converter or another piece of equipment might provide relevant information in certain embodiments. For example, there could be a communication interface between a CPU, a GPU or a memory device and their respective power converters. The load might even be able to predict its future behavior to a certain extent. Thus, the selection of the load scenario from among the plurality of predefined load scenarios could be performed using such information instead of comparing current load conditions with the predefined load scenarios.

According to another preferred embodiment, the operation of the performance feedback signal generator may include using a quantification of a difference between a current signal of at least one of the output quantities and a desired signal of this output quantity. Also here, the desired signal may correspond to an "optimal" signal defined for a load scenario selected from among a plurality of predefined load scenarios, in a similar manner as explained above. Also here, a comparison of current load conditions with the predefined load scenarios may be used for the selection. Again, a certain metric may be used or a trained neural network may implement the comparison. In particular, the current load conditions to be compared may be the present output current. An optimal signal would then be defined for the closest predefined output current scenario (load profile).

In a further preferred embodiment, the operation of the parameter predictor, namely the updating of the at least one regulator parameter, may as well or alternatively be based on at least one regulator parameter value, for example regulator parameter values for the P, I, D coefficients, being associated to a load scenario selected from among a plurality of predefined load scenarios, as explained above. Again, the selection can be made using a comparison of current load conditions with a predefined load scenario and the above explanations apply analogously.

According to a further preferred embodiment, the electric power converter may also be provided with a signal analyzer which serves for comparing current load conditions with the above explained predefined load scenarios in order to determine if a sufficiently "similar" load scenario can be found or not. This can be done by using a certain predetermined threshold metric. If a load scenario within the predetermined threshold metric can be found, the respective data defined for this load scenario can be selected such as the optimal output signal to be used for the deviation detection, the desired signal for the difference quantification for the performance feedback signal generation, and/or the regulator value parameter associated to the selected load scenario. According to this embodiment, however, an updating of the at least one regulator parameter can be inhibited by the signal analyzer in certain cases where an appropriate comparable load scenario cannot be found and thus an updating would possibly lead to an uncertain or even detrimental performance of the power converter.

As explained above, the comparison of the current load conditions and the predefined load scenarios can be performed by using a trained neural network. This neural network is not necessarily local but could also be located remotely. Further or alternatively, a trained neural network can also be implemented for providing the quantification of the difference between the current signal and the desired signal of the respective output quantity for providing the performance feedback signal, as explained above.

Still further and again alternatively, a trained neural network can also be implemented in or for the deviation detector to determine the deviations between the current signal and the desired signal of the respective output quantity.

The deviation detector and the signal analyzer could, in particular, be implemented based on an encoder-decoder architecture. Therein, the decoder might be the same but the encoder different.

The current load conditions to be compared with the predefined load scenarios as explained above are preferably representative for a certain current time period in order to reflect the development in time of the respective at least one output quantity. Therein, more recent data are preferably weighed higher in the comparison with the predefined load scenarios than less recent data according to a further embodiment. The same applies analogously for any comparison of input quantities and output quantities, in particular as regards the provision of the performance feedback signal.

So far, voltage and current signals have been predominantly discussed herein. However, according to a preferred embodiment, also the temperature at some measurement point, preferably at a measurement point in the power converter itself, may be taken into account. Therefore, the parameter predictor may comprise a temperature input terminal for receiving a temperature input signal and may be responsive also to the temperature input signal in the updating of the at least one regulator parameter. Thereby, the power converter may be controlled even better due to the fact that the operating conditions of the power converter are generally temperature dependent, in particular due to a temperature dependency of certain electric components. This can be taken into account more efficiently if considering the temperature as such.

The operation of the parameter predictor for determining an improved regulator parameter for the updating can follow at least one of the following methods: a Monte Carlo method, Q-learning, SARSA, Q-learning-lambda, SARSA-lambda, DQN, DDPG, A3C, NAF, TRPO, PPO. Therein, SARSA stands for state-action-reward-state-action, namely an algorithm for learning a Markov decision process policy, this policy used in a reinforcement learning of the parameter predictor. DQN stands for Deep Q Network, DDPG stands for Deep Deterministic Policy Gradient, A3C stands for Asynchronous Advantage-Actor Critic Algorithm, NAF stands for Q-Learning with Normalized Advantage Functions, TRPO stands for Trust Region Policy Optimization, and PPO stands for Proximal Policy Optimization. These methods are familiar to the skilled person and need not be explained here.

Beside the electric power converter claimed in the appended claims and described herein, also a method of operating an electric power converter is disclosed according to another aspect of the invention. This method includes the steps: receiving the input quantities, outputting the converted output quantities, switching a switching device for a conversion operation of the electric power converter, controlling the switching device by a regulator based on at least one regulator parameter, updating the at least one regulator parameter of the regulator by a parameter predictor, providing a performance feedback signal indicative of a performance of the conversion operation, updating the at least one regulator parameter based on the performance feedback signal during update intervals, the update intervals taking place during the power conversion operation and being separated by pauses during which no update of the at least one regulator parameter is carried out.

It will be appreciated that the method and preferred embodiments thereof also appear from what has been explained for the different embodiments of the power converter and the functions of its components. All these embodiments shall apply analogously to the method.

BRIEF DESCRIPTION OF THE DRAWINGS

Below, the invention is explained in further detail by means of exemplary embodiments. Therein, the individual features can also be relevant for the invention in a different combination.

DETAILED DESCRIPTION

Figure 1:
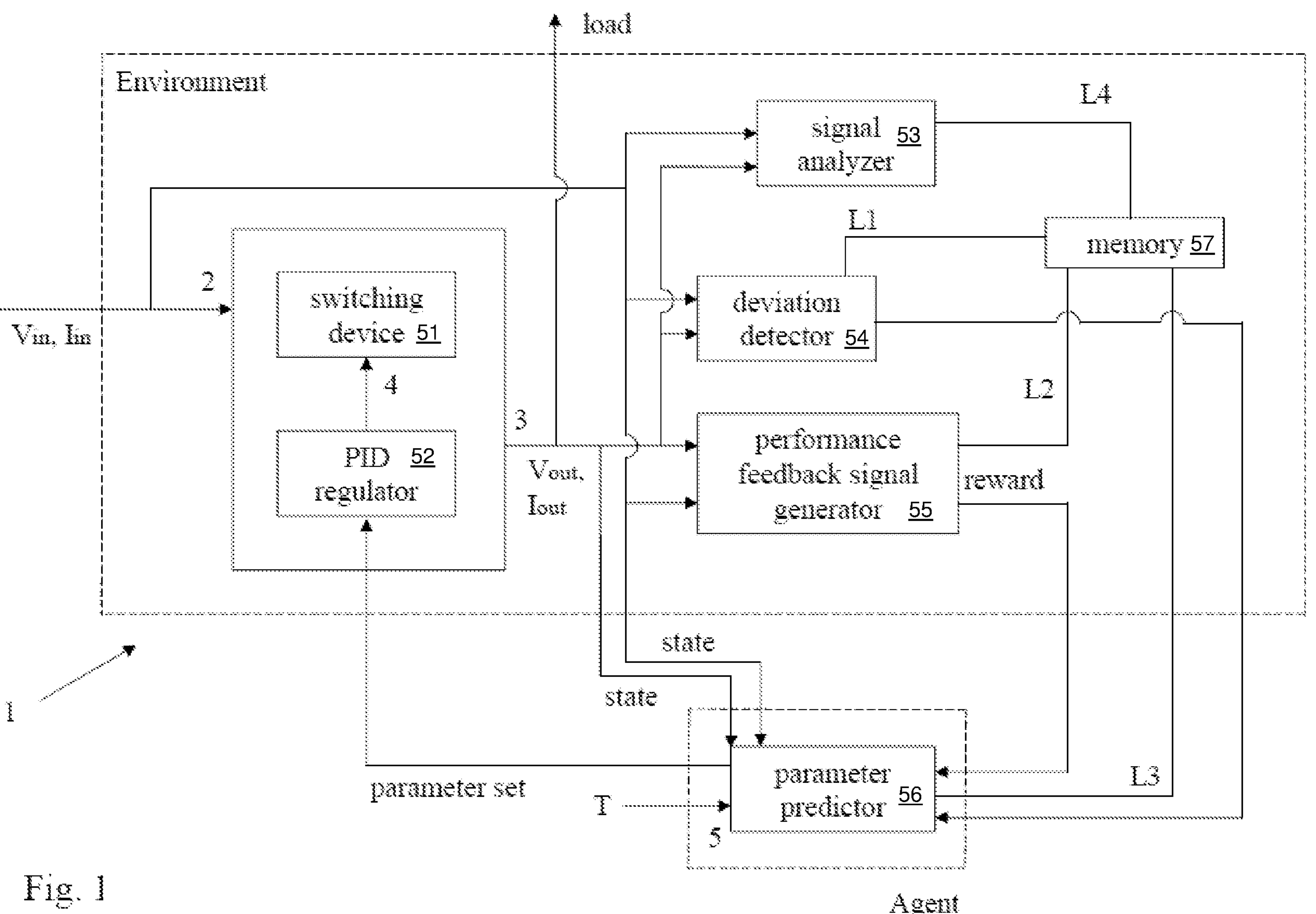
FIG. 1 is a schematic circuit diagram according to embodiments herein.

The present embodiment relates to an electric power converter for power supply of a CPU.

In this embodiment, the power converter is controlled by a PID controller and is a voltage regulator adapted for power supplying a CPU of a computer. An important practical problem is the response of the power converter to load steps that are typical for the CPU as a load.

Although such and other power converters are in long and widespread use, the "tuning" of the regulator parameters of a regulator for controlling the switching operation of a switching device, such as the P, I, D coefficients therein, is still a delicate subject. On the one hand, power converters are required to be highly efficient in terms of energy, on the other hand they shall perform as well as possible even under demanding conditions such as load steps occurring in power supplying a CPU or GPU. The inventors have found that this situation is even more complex since the performance of a power converter also depends on the quantity of certain component values, for instance of passive components. Since these components and devices may be subject to ageing processes which also influence their respective electric value, such as the capacitance of an electric capacitor, a once well-tuned power converter might degrade with time.

A counter-measure is to use higher quality components, in particular capacitors, which may reduce ageing effects. However, costs are increased substantially thereby. In contrast thereto, the present invention allows an adaption of the power converter to possible changes of its working conditions or electric values of components by using a parameter predictor and providing a performance feedback signal to the parameter predictor as explained below. Thereby, the parameter predictor can test or evaluate the effect of certain updates of the at least on regulator parameter in order to improve the power converter performance by adequate updated regulator parameter values.

As a preferred example, so called "reinforcement learning" or "self-learning" would be one of several adequate approaches to be used by the parameter predictor based on the performance feedback signal provided. Other terms for this technique are "approximate dynamic programming" and "neuro-dynamic programming". In this case, the performance feedback value signal can be named a reward function signal or objective function signal.

The above-described updating is performed during the power conversion operation of the power converter in contrast to different approaches of supervised learning which would be used before the start of the power conversion operation. Naturally, a sophisticated tuning of the power converter's regulator parameter(s) before the conversion operation start is not excluded by this invention but it will be appreciated that, due to the invention, the initial tuning is not necessarily as critical as it would be without the invention. Further, a tuning by supervised learning before the conversion operation would lead to a tuning which depends on the quality, complexity and completeness of the training data used.

In contrast thereto, the invention uses an assessment of the power converter's performance "in reality", namely during the conversion operation and is, thus, not limited by any previously known training data. As stated above, however, any use of training data, in particular before the power conversion operation for an initial tuning, is not excluded thereby. A use of further input signals for the parameter predictor than the performance feedback signal is not excluded, neither.

FIG. 1 shows a schematic architecture of an embodiment. Therein, the rectangles in hatched lines represent an "environment" and an "agent" in terms of reinforcement learning. Namely, the agent is a parameter predictor 56, as shown in FIG. 1, and the environment comprises a voltage regulator 1 as an implementation of a power converter. The input quantities at the input 2 on the left side of the voltage regulator 1 are an input voltage $V_{in}$ and an input current $I_{in}$, and the output quantities at the output 3 on the right side are an output voltage $V_{out}$ and an output current $I_{out}$. The input quantities and the output quantities are fed into a performance feedback signal generator 55 and a deviation detector 54. The deviation detector, the performance feedback signal generator, and the parameter predictor are connected to a memory 57, respectively, compare lines L1, L2, L3 in FIG. 1.

In the present embodiment, the deviation detector is operable to continuously monitor one or more of the output quantities $V_{out}$ and $I_{out}$ and a deviation of their current signal from a desired output signal. The desired output signal can be taken from the memory via line L1, namely as an optimal output signal defined for a certain load scenario stored therein. This load scenario is selected by the deviation detector from a plurality of predefined load scenarios in the memory. This selection is based on a comparison of current load conditions of the power converter with the stored load scenarios and a metric for this comparison can be the "area" between the respective response curves.

In particular in case of a load step, namely a fast stepwise change of the output current, the actual voltage response, namely the output voltage curve during the load step, is compared to optimal output voltage curves stored in the memory for a plurality of predefined different load scenarios including load steps of different heights and slopes. Although in case of a load step, the output voltage of the voltage regulator would ideally be a constant voltage, the "optimal output curves" may also be more realistic and reflect what is actually feasible for the power converter implemented. Then, for example the area between the current output voltage signal and the optimal output voltage signal would be a quantified deviation. If it is above a certain predefined threshold value, the deviation detector triggers an update interval.

It has been explained earlier that the deviation detector might be active only at certain times, with a certain frequency or only after a restart. These explanations apply here as well.

The triggering of an update interval initiates a regulator parameter prediction and update process and therefore puts the parameter predictor into operation. The parameter predictor may also be connected to the memory, as shown by line L3 in FIG. 1. Therefore, the memory may also comprise regulator parameter values (such as P, I, D coefficients) for the load scenario selected as explained above. Thus, the parameter predictor may use the respective PID coefficients as updated regulator parameters and forward them to the PID controller in the power converter via line L3 connecting both shown as in FIG. 1.

Alternatively, the parameter predictor randomly makes a small change of the regulator parameter values and evaluates the resulting performance feedback signal. If the performance decreased, the parameter predictor makes another small change, e.g. starting from the original parameters (before the former change), again in a random manner This process is iterated until a performance improvement is found. Then the updated regulator parameter values are kept.

In a more advanced embodiment than this random policy, the parameter predictor learns from previous error modes and then makes more advanced guesses. For example, the error is decomposed in components indicating certain actions, such as increasing the D coefficient, and then a respective update is increased in small steps by multiplying the original increment with a small value (which would be basically a Q learning method).

In this embodiment this regulator parameter prediction update process takes place during the power conversion operation of the power converter so that current output signals of the output quantities are produced in real operation immediately after the update of the regulator parameters. Consequently, the performance feedback signal generator shown in FIG. 1 receives these current output signals and is then, for the next load step occurring, operable to compare them to optimal output signals defined for a load scenario to be selected for this next load step as described above. In particular, in a lot of important applications, a load like for example a CPU quickly turns on and off a kernel or the like and thus produces a sequence of load steps. It can, thus, produce a performance feedback signal which may be the quantified metric as explained above, namely the area between the curves of the current output signals in this next load step and the optimal output signals for the respective selected load scenario.

The parameter predictor receives the performance feedback signal or reward signal via line L4 in FIG. 1 and compares it to a performance threshold value. Therefore, the parameter predictor can determine if the update has led to a sufficient improvement or not.

In a simple embodiment, the parameter predictor uses a Monte Carlo approach, namely a random guess of new updated regulator parameters for the P, I, D coefficients. In this approach, the difference between the former and the updated parameters is limited to a certain extent and only small changes are allowed. After setting the randomly changed regulator parameters, the performance feedback signal indicates whether an improvement has been achieved or not. If not, a re-iteration can take place in that a new regulator parameter set for updating can be chosen randomly within the same update interval and this procedure can be re-iterated until the performance feedback signal indicates an improvement, again within the same update interval.

It may be more effective to update one regulator parameter after the other, instead of making a guess for all parameters, for example for all three P, I, D coefficients together. Since certain deviations from an ideal performance might be strongly connected to only a specific is one of the regulator parameters, it may, however, be efficient to choose the type of parameter (P or I or D for instance) to be updated randomly or in a predetermined order and not to repeat guesses for one and the same parameter if they are not successful. It might happen that the updated parameter is not strongly connected to the actually occurring deviation from an ideal performance so that an updating of another one is more appropriate.

Alternatively, the memory may comprise, for each load scenario in the stored plurality, a typical error signal. In other words, the memory may comprise non-optimal, but typical output signals for an output quantity (here the voltage) to enable a comparison between a current output signal and these typical erroneous output signals. As an example, the typical output signals may be stored in groups allocated to the types of regulator parameters, such as one group for the P coefficient, one for the I coefficient, and another group for the D coefficient. In this example, the parameter update process could proceed stepwise and could for example start with comparing the error with the load scenarios in the group allocated to the I coefficient, the parameter predictor could select the closest one, namely a similar transient response, and could use an I parameter change value stored with this selected load scenario in the memory. Then, the same could be repeated for the D coefficient by comparing to the respective group of load scenarios and selecting an appropriate one and using the respective stored D coefficient change value. Thereafter, the same procedure would be repeated for the P coefficient. This procedure could be repeated completely or in part until a certain PID coefficient set has been set and a sufficiently "good" performance feedback signal has been reached.

In a more general language, a principal component analysis of an error can be performed and a corrective action in terms of a parameter update be chosen along the dominant component. This is repeated until the performance feedback signal is deemed satisfactory.

FIG. 1 also shows a signal analyzer 53 connected to the deviation detector 54 as well as to the input and output quantity lines and to the memory (line L4). The signal analyzer may be added in cases where there is a residual probability that appropriate stored load scenarios are not available in the data contained in the memory. In other words, the signal analyzer can be helpful in cases where extraordinary load conditions might occur or where the data in the memory is insufficient for certain load conditions possible. Then, the signal analyzer could check and determine if a sufficiently similar load scenario can be found, for example by using the same metric as has been explained before (area between curves). After having been activated by the deviation detector, the signal analyzer could inhibit a triggering of an update interval whenever an appropriate load scenario for the present conditions cannot be found. This could obviate fruitless or even detrimental update processes and save energy, in addition.

The elements in FIG. 1 beside the switching device 51 may be implemented as a software, for example in a microcontroller, or as a dedicated hardware which may be programmable.

Figure 2:
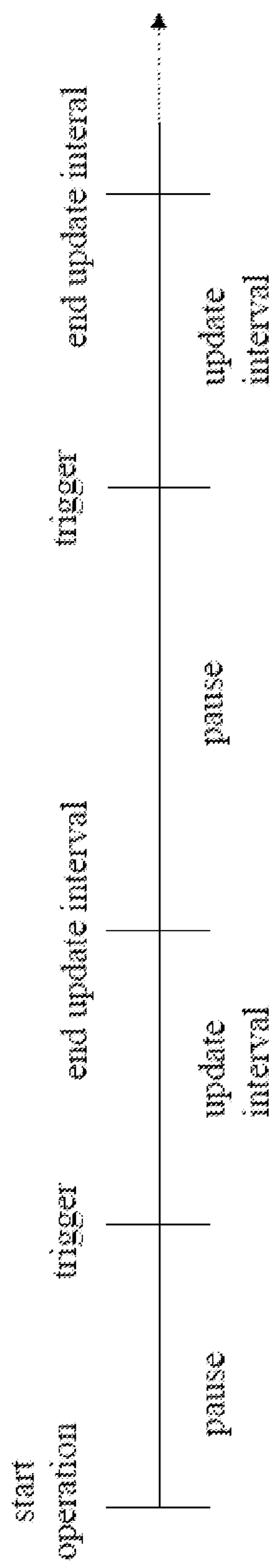
FIG. 2 is a schematic time schedule of the operations in different intervals according to embodiments herein.

The time schedule of update intervals separated by pauses can be seen schematically in FIG. 2. Usually the frequency of update intervals could be in the range of $10^{-2}$ Hz to $10^{2}$ Hz whereas the PID regulator 52 might operate at $10^{4}$ Hz to $10^{6}$ Hz but this is not mandatory.

Figure 3:
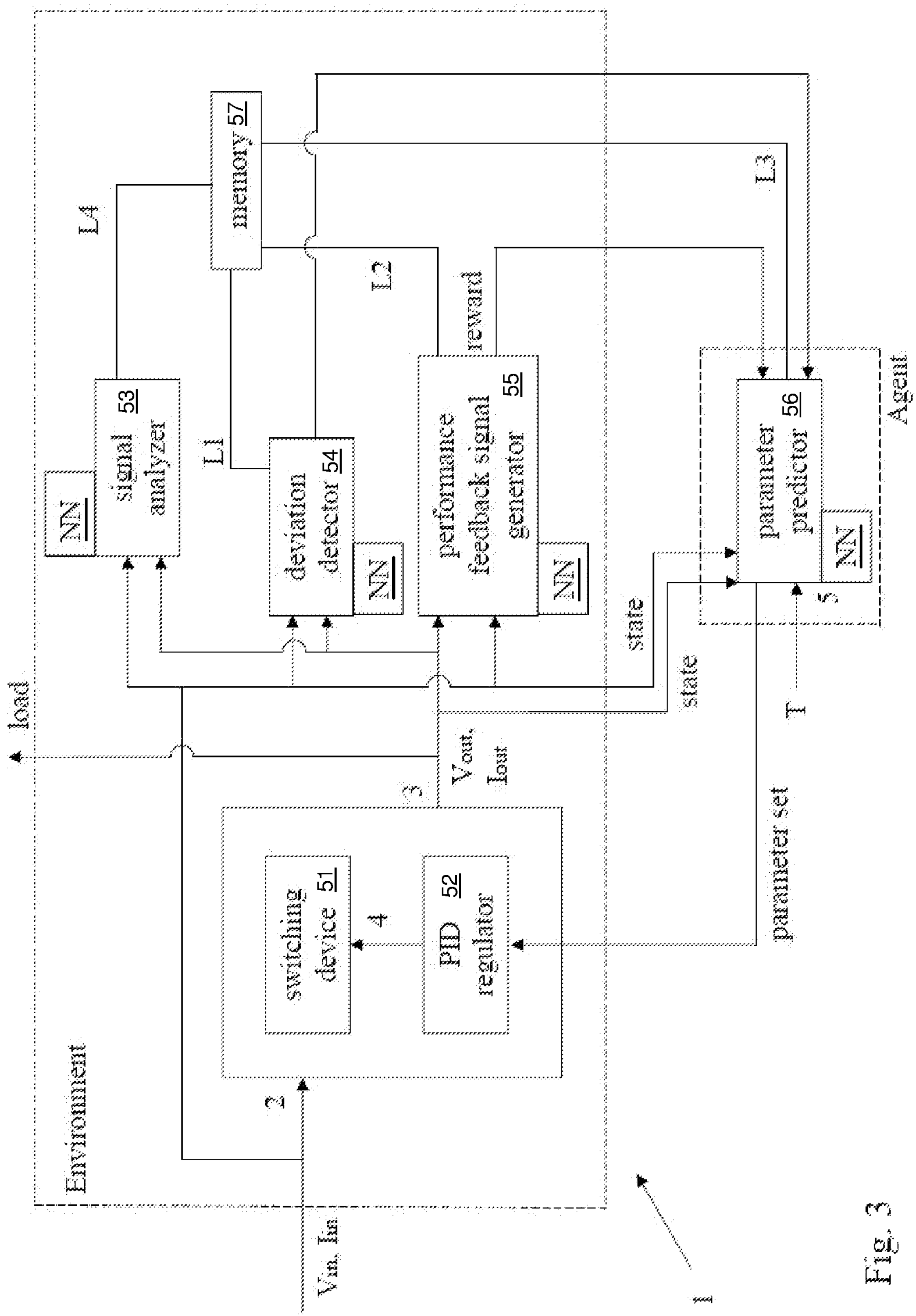
FIG. 3 is a schematic circuit diagram of a power converter according to embodiments herein.

The comparison between the current load conditions of the power converter with the predefined load scenarios can easily be done by a trained neural network as an alternative to the above mentioned metric (area between curves) and a respective neural network could be part of the deviation detector, the performance feedback signal generator 55 (if different from the deviation detector) and the parameter predictor, respectively. A trained neural network is also an appropriate implementation for the quantification of the difference between the current output signal and the desired output signal, here in terms of the output voltage, this applying to the deviation detector and/or to the parameter predictor. Neural networks NN in these functions are shown in FIG. 3.

In the above description, output signals as actually detected are compared to stored output signals. In any of these comparisons, certain time intervals can be chosen and taken into account and, preferably, the data in these time periods may be weighed higher the younger they are. For example, the weight might be linear to the "age" of the data.

As shown in FIG. 1, the parameter predictor may also have a temperature input terminal 5. Thereby, the parameter predictor may take into account a temperature influence on the regulator parameters when updating. Further, the data stored in the memory for certain load scenarios might also include temperatures. However, it might be advantageous and sufficient to implement a certain function for the temperature influence in the parameter predictor.

FIG. 4 is a flow diagram for illustrating the method steps of the operation of the power converter as explained. Actually, in a first step, the input voltage $V_{in}$ and the input current $I_{in}$ are received by the power converter. The power converter operates to produce respective converted output quantities, namely the output voltage $V_{out}$ and the output current $I_{out}$, which is done by a switching operation of a switching device in the power converter. The switching device is controlled in this operation by the PID regulator included in the power converter on the basis of P, I, D coefficients set therein by the parameter predictor. These parameters are updated during the update intervals by the parameter predictor whereas the performance feedback signal generator generates the performance feedback signal for enabling the parameter predictor to find appropriate updated parameters. The update intervals are triggered if a deviation detector has found a deviation between current output signals and optimal output signals beyond a certain threshold value, whereas there is no updating operation outside the update intervals, in other words in pauses of the update operation. Such pauses could typically last for one hour or even longer depending on how slowly the operating conditions of the power converter change, in particular depending on ageing processes of components therein.

All in all, the embodiment offers the important advantages of a "real operation" automatic re-tuning of the regulator, here the PID regulator, of the power converter to changing conditions, in particular to component value shifts because of ageing effects. However, although the option of a continuous optimization of the regulator parameters would exist, the inventors have chosen to restrict the update process to limited update intervals separated by pauses in this embodiment. This saves energy and is particularly advantages for relatively slowly changing operating conditions. Therefore, small deviations from an optimal performance are tolerated within the pauses, for example small overcurrents. Finally, the retuning does not necessitate an operation interruption of the power converter and, further, the efforts in the initial tuning may be limited in this embodiment.

The invention claimed is:

1. An electric power converter for converting input quantities, namely an input voltage $V_{in}$ and an input current $I_{in}$, into converted output quantities, namely a converted output voltage $V_{out}$ and a converted output current $I_{out}$, the electric power converter comprising:

an input terminal for receiving the input quantities;

an output terminal for outputting the converted output quantities;

a switching device to be switched for a conversion operation of the electric power converter, the switching device having a control terminal;

a regulator connected to the control terminal, the regulator controlling the switching device based on at least one regulator parameter;

a parameter predictor operative to carry out a prediction of the at least one regulator parameter and updating the at least one regulator parameter of the regulator based on the prediction;

a performance feedback signal generator connected to the output terminal of the electric power converter, the performance feedback signal generator operable to produce a performance feedback signal indicative of a performance of the conversion operation; and the parameter predictor operative to predict and update the at least one regulator parameter based on the performance feedback signal during update intervals, the update intervals taking place during the power conversion operation and being separated by pauses during which no update of the at least one regulator parameter is carried out.

2. The electric power converter of claim 1 further comprising:

a deviation detector connected to the output terminal of the electric power converter, the deviation detector operative to determine a deviation between a current signal of at least one of the output quantities and a desired output signal of the respective one of the output quantities;

wherein the parameter predictor is operative to, in at least one mode of operation of the electric power converter, trigger an update interval for updating the at least one regulator parameter in response to the determined deviation exceeding a predetermined threshold.

3. The electric power converter of claim 2, wherein the desired output signal corresponds to an optimal output signal defined for a load scenario selected from among a plurality of predefined load scenarios.

4. The electric power converter of claim 3, wherein the selection of the load scenario from the plurality of predefined load scenarios is performed using a comparison of current load conditions of the electric power converter with the plurality of predefined load scenarios.

5. The electric power converter of claim 4 further comprising: a trained neural network NN operable to compare the current load conditions of the electric power converter with the predefined load scenarios.

6. The electric power converter of claim 4, wherein the current load conditions for the comparison with the predefined load scenarios comprise load condition data of at least one of the output quantities of the electric power converter within a current time period and wherein more recent data in said load condition data are weighed higher in the comparison than less recent data in said load condition data.

7. The electric power converter of claim 3 further comprising:

a signal analyzer operable to compare current load conditions of the electric power converter with the predefined load scenarios and to inhibit an update of the at least one regulator parameter in response to detecting that a load scenario within a predetermined threshold metric from the current load conditions cannot be found among the plurality of load scenarios.

8. The electric power converter of claim 2, wherein the deviation detector comprises a trained neural network NN operable to determine the deviations between the current signal and the desired signal of the respective one of the output quantities.

9. The electric power converter of claim 1, wherein the performance feedback signal generator is operable to output the performance feedback signal as a function of a difference between a current signal of at least one of the output quantities and a desired signal of the respective one of the output quantities, wherein the desired signal corresponds to an optimal signal of the respective one of the output quantities defined for a load scenario selected from among a plurality of predefined load scenarios.

10. The electric power converter of claim 9 further comprising: a trained neural network NN operable to provide a quantification of the difference between the current signal and the desired signal of the respective one of the output quantities.

11. The electric power converter of claim 1, wherein the parameter predictor is operable to update the at least one regulator parameter to at least one regulator parameter value associated to a load scenario selected from among a plurality of predefined load scenarios.

12. The electric power converter of claim 1, wherein the parameter predictor has a temperature input terminal to receive a temperature input signal and is operable to update the at least one regulator parameter in response to the temperature input signal at the temperature input terminal.

13. The electric power converter of claim 1, wherein the parameter predictor is operable to update the at least one regulator parameter by one of the following methods: a Monte Carlo method, Q-learning, SARSA, Q-learning-lambda, SARSA-lambda, DQN, DDPG, A3C, NAF, TRPO, PPO.

14. A method of operating an electric power converter for converting input quantities, namely an input voltage $V_{in}$ and an input current $I_{in}$, into converted output quantities, namely a converted output voltage $V_{out}$ and a converted output current $I_{out}$, the method comprising:

receiving the input quantities;

outputting the converted output quantities;

switching a switching device for a conversion operation of the electric power converter;

controlling the switching device by a regulator based on at least one regulator parameter;

via a parameter predictor, predicting the at least one regulator parameter and updating the at least one regulator parameter of the regulator based on the prediction, providing a performance feedback signal indicative of a performance of the conversion operation;

predicting and updating the at least one regulator parameter based on the performance feedback signal during update intervals; and the update intervals taking place during the power conversion operation and being separated by pauses during which no update of the at least one regulator parameter is carried out.

15. The method of claim 14, wherein the pauses separating the update intervals are at least one hour in duration.

16. The method of claim 14 further comprising:

determining a deviation between a current signal of at least one of the output quantities and a desired output signal of the respective one of the output quantities; and triggering an update interval for updating the at least one regulator parameter in response to the determined deviation exceeding a predetermined threshold.

17. The method of claim 16, wherein the desired output signal corresponds to an optimal output signal defined for a load scenario selected from among a plurality of predefined load scenarios.

18. The method of claim 17, wherein the selection from the plurality of predefined load scenarios is performed using a comparison of current load conditions of the power converter with the predefined load scenarios.

19. The method of claim 14 further comprising:

generating the performance feedback signal as a function of a quantification of a difference between a current signal of at least one of the output quantities and a desired signal of the respective one of the output quantities, wherein the desired signal corresponds to an optimal signal of the respective one of the output quantities defined for a load scenario selected from among a plurality of predefined load scenarios.

20. The method as in claim 14 further comprising:

updating the at least one regulator parameter to at least one regulator parameter value associated to a load scenario selected from among a plurality of predefined load scenarios.

* * * * *